United States Patent
Hayakawa et al.

(10) Patent No.: US 12,049,188 B2
(45) Date of Patent: Jul. 30, 2024

(54) VEHICLE STRUCTURE WITH ANCHOR UNIT

(71) Applicant: HONDA MOTOR CO., LTD., Tokyo (JP)

(72) Inventors: Hirotaka Hayakawa, Tokyo (JP); Kazuma Sasaki, Tokyo (JP); Hiroshi Takagi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/125,866

(22) Filed: Mar. 24, 2023

(65) Prior Publication Data
US 2023/0311807 A1    Oct. 5, 2023

(30) Foreign Application Priority Data

Mar. 31, 2022    (JP) ................... 2022-059702

(51) Int. Cl.
*B60R 22/22*    (2006.01)
*B60R 22/24*    (2006.01)
*B62D 25/20*    (2006.01)

(52) U.S. Cl.
CPC .............. *B60R 22/22* (2013.01); *B60R 22/24* (2013.01); *B62D 25/20* (2013.01)

(58) Field of Classification Search
CPC .................. B60R 22/22; B60R 25/20
See application file for complete search history.

(56) References Cited

U.S. PATENT DOCUMENTS

| | | | | |
|---|---|---|---|---|
| 5,344,188 A | * | 9/1994 | Mims ..................... | B60R 22/22 280/808 |
| 6,854,767 B2 | * | 2/2005 | Yakata ................... | B62D 25/07 280/808 |
| 7,237,829 B2 | * | 7/2007 | Latimer, III ....... | B62D 25/2036 296/187.11 |
| 2005/0212321 A1 | * | 9/2005 | Yamamoto ............. | B60R 22/22 296/65.03 |
| 2017/0113541 A1 | * | 4/2017 | Muramatsu .......... | B60K 15/063 |
| 2023/0024506 A1 | * | 1/2023 | Nitta ..................... | B62D 43/10 |
| 2023/0311793 A1 | * | 10/2023 | Hayakawa ......... | B62D 25/2027 296/187.12 |
| 2023/0311807 A1 | * | 10/2023 | Hayakawa ............. | B60R 22/22 280/801.1 |

FOREIGN PATENT DOCUMENTS

| | | | | | |
|---|---|---|---|---|---|
| CN | 113246811 A | * | 8/2021 | | |
| CN | 116923310 A | * | 10/2023 | ............. | B60R 22/22 |

(Continued)

*Primary Examiner* — Nicole T Verley
(74) *Attorney, Agent, or Firm* — Amin, Turocy & Watson, LLP

(57) ABSTRACT

A vehicle structure with an anchor unit includes a floor panel, a left anchor member and a right anchor member. The floor panel is disposed below a rear seat. The left anchor member and the right anchor member are connected to the floor panel by a left anchor attachment portion and a right anchor attachment portion. The floor panel has a left raised sidewall and a right raised sidewall extending in an upward/downward direction, and the left anchor attachment portion and the right anchor attachment portion are provided on the left raised sidewall and the right raised sidewall.

10 Claims, 9 Drawing Sheets

(56) References Cited

FOREIGN PATENT DOCUMENTS

| | | | | |
|---|---|---|---|---|
| DE | 3316608 A1 | * | 11/1984 | |
| DE | 102019218697 A1 | * | 6/2021 | |
| EP | 1170168 A2 | * | 1/2002 | ........... B60N 2/2827 |
| EP | 2628665 A1 | * | 8/2013 | ............. B62D 25/20 |
| FR | 2789033 A1 | * | 8/2000 | ............. B60R 22/22 |
| FR | 3134052 A1 | * | 10/2023 | |
| JP | 2001-328569 | | 11/2001 | |
| JP | 2001328569 A | * | 11/2001 | |
| JP | 2004306775 A | * | 11/2004 | |
| JP | 2006224731 A | * | 8/2006 | |
| JP | 4032725 B2 | * | 1/2008 | |
| JP | 2008013052 A | * | 1/2008 | |
| JP | 2011143882 A | * | 7/2011 | |
| JP | 5029270 B2 | * | 9/2012 | |
| JP | 2018020672 A | * | 2/2018 | |
| JP | 6892272 B2 | * | 6/2021 | |
| JP | 7029663 B2 | * | 3/2022 | |
| JP | 7131881 B2 | * | 9/2022 | |
| JP | 2023013130 A | * | 1/2023 | ............. B62D 43/10 |
| JP | 2023013132 A | * | 1/2023 | ............. B62D 43/10 |
| WO | WO-2021060342 A1 | * | 4/2021 | |
| WO | WO-2022209616 A1 | * | 10/2022 | |

* cited by examiner

VEHICLE STRUCTURE WITH ANCHOR UNIT

CROSS-REFERENCE TO RELATED APPLICATION

Priority is claimed on Japanese Patent Application No. 2022-059702, filed on Mar. 31, 2022, the contents of which are incorporated herein by reference.

BACKGROUND

Field of the Invention

The present invention relates to a vehicle structure with an anchor unit.

Background

As a vehicle structure with an anchor unit, a structure in which a longitudinal wall portion of a floor pan and a cross member are connected by a reinforcement member, the reinforcement member is provided on a seat placing portion of the floor pan, and an anchor attachment portion is attached to the reinforcement member is known. According to the vehicle structure with an anchor unit, it is possible to prevent movement of a position of an anchor member due to deformation of the seat placing portion by increasing rigidity of the seat placing portion in a vehicle forward/rearward direction using the reinforcement member (for example, see Japanese Unexamined Patent Application, First Publication No. 2001-328569).

SUMMARY

However, in the vehicle structure with an anchor unit disclosed in Japanese Unexamined Patent Application, First Publication No. 2001-328569, the anchor attachment portion is attached to the seat placing portion via the reinforcement member. The seat placing portion is disposed horizontally in order to place a seat. Accordingly, when a tensile load is input to a seat belt (i.e., an anchor member), the tensile load input from the anchor member is applied to the seat placing portion in a vertical direction. For this reason, it is difficult to secure rigidity of the seat placing portion against the tensile load, and it is conceivable that the seat placing portion (i.e., a floor panel) will be deformed.

As a countermeasure, for example, it is conceivable to increase the rigidity of the seat placing portion. However, the weight may be increased by increasing the rigidity of the seat placing portion.

An aspect of the present invention is directed to providing a vehicle structure with an anchor unit in which deformation of a floor panel due to a tensile load input from an anchor member is able to be curbed.

A vehicle structure with an anchor unit according to a first aspect of the present invention includes: a floor panel disposed below a rear seat; and an anchor member of a seat belt connected to the floor panel by an anchor attachment portion, wherein the floor panel has a wall portion extending in an upward/downward direction, and the anchor attachment portion is provided on the wall portion.

According to the above-mentioned configuration, the anchor member can be attached (connected) to the wall portion of the floor panel by the anchor attachment portion. Accordingly, when a tensile load is applied to anchor member via the seat belt toward an upper front side, the tensile load directed toward the upper front side is input to the wall portion via the anchor member. The wall portion to which the tensile load is input extends in the upward/downward direction. Accordingly, the wall portion can receive the tensile load directed toward the upper front side in a direction along the wall portion (hereinafter, may be referred to as a shearing direction).

In this way, since the tensile load is applied along the wall portion in the shearing direction, in comparison with the case in which the tensile load is applied to the wall portion in the vertical direction, rigidity of the wall portion against the tensile load can be increased. Accordingly, the tensile load input to the wall portion via the anchor member can be efficiently transmitted and distributed in the entire floor panel. Accordingly, support rigidity of the seat belt can be secured, and deformation of the floor panel due to the tensile load input from the anchor member can be suppressed.

In this way, since the anchor member is attached to the wall portion of the floor panel, deformation of the floor panel due to the tensile load input from the anchor member can be suppressed without increasing the weight of the vehicle, and reduction in weight of the vehicle is achieved.

In a second aspect, the floor panel may have a raised portion rising upward at a center in a vehicle width direction, and the wall portion may be a sidewall of the raised portion disposed at a side surface in the vehicle width direction.

According to the above-mentioned configuration, there is no need to form a new wall portion by forming the wall portion using the sidewall of the raised portion. Accordingly, simplification of the configuration can be achieved. In addition, the raised portion is an area with a relatively high rigidity by being raised upward. Accordingly, since the wall portion to which the anchor member is attached is formed using the sidewall of the raised portion, support rigidity of the wall portion against the tensile load input from the seat belt (i.e., the anchor member) can be increased.

In a third aspect, the anchor attachment portion may be attached to a lower section at an outer side in the vehicle width direction of the sidewall of the raised portion.

According to the above-mentioned configuration, the anchor attachment portion can be attached to a rising-up section of the raised portion. The rising-up section of the raised portion is an area with a relatively high rigidity in the raised portion. Accordingly, since the anchor attachment portion is attached to the rising-up section of the raised portion, the tensile load input from the anchor attachment portion can be supported by the entire raised portion. Accordingly, support rigidity of the anchor member against the tensile load can be further increased.

A fourth aspect may include: a stiffener extending in a vehicle forward/rearward direction to an outer side of a passenger compartment in the floor panel, wherein the anchor member may be bonded to the stiffener by the anchor attachment portion.

According to the above-mentioned configuration, the tensile load input from the anchor member can be supported by the stiffener. Accordingly, support rigidity of the anchor member against the tensile load can be further increased.

In a fifth aspect, the stiffener may have a plurality of beads extending in a longitudinal direction of the stiffener on both sides in the vehicle width direction of the anchor attachment portion.

According to the above-mentioned configuration, rigidity of the stiffener can be increased by the beads. Accordingly, the tensile load input from the anchor member can be more appropriately supported by the stiffener. Accordingly, support rigidity of the anchor member against the tensile load can be further increased.

A sixth aspect may include: a tire pan provided on a vehicle rearward side of the floor panel and recessed downward; and a bead portion extending in the vehicle forward/rearward direction at a vehicle forward position of the tire pan, wherein the stiffener may extend to the bead portion toward a vehicle rearward direction.

According to the above-mentioned configuration, the tensile load input from the anchor member can be transmitted to the tire pan via the stiffener and the bead portion. The tire pan is an area with a high rigidity by being formed in a recessed shape. Accordingly, since the tensile load is transmitted to the tire pan, the tensile load can be appropriately supported by the tire pan. Accordingly, support rigidity of the anchor member against the tensile load can be further increased, and displacement of the anchor member due to the tensile load can be suppressed by a simple configuration including the bead portion.

A seventh aspect may include: a front cross member provided at a vehicle forward position of the raised portion; and a rear cross member provided at a vehicle rearward position of the raised portion and connected to a damper housing, wherein the stiffener may extend from the front cross member toward a vehicle rearward side and cross the rear cross member.

According to the above-mentioned configuration, rigidity of the stiffener can be increased by the front cross member and the rear cross member. Accordingly, the tensile load input from the anchor member can be efficiently transmitted to the floor cross member and the rear cross member via the stiffener and supported by the floor cross member and the rear cross member.

Here, the rear cross member is connected to the damper housing, and thereby, the rigidity of the rear cross member is ensured. The stiffener crosses the rear cross member. Accordingly, the tensile load transmitted from the stiffener to the rear cross member can be efficiently distributed to the rear cross member and can be further appropriately supported. Accordingly, support rigidity of the anchor member against the tensile load can be further increased, and displacement of the anchor member due to the tensile load can be suppressed by a simple configuration in which the stiffener extends from the front cross member to the rear cross member.

In an eighth aspect, the rear cross member may be disposed on a stepped portion inclined upward toward a vehicle rearward direction from a bottom portion of the floor panel disposed below the anchor attachment portion, and the anchor attachment portion may be disposed at a position lower than the rear cross member.

According to the above-mentioned configuration, the tensile load input to the anchor attachment portion can be diverted from the bottom portion of the floor panel toward the stepped portion at an acute angle. Accordingly, rigidity on the side of the stepped portion against the tensile load input to the anchor attachment portion can be increased. In addition, the rear cross member is disposed on the stepped portion. Accordingly, the tensile load input to the anchor member can be efficiently supported by the rear cross member, and support rigidity of the anchor member against the tensile load can be further increased.

In a ninth aspect, the stiffener may include an upper portion that forms a hollow cross section with an apex portion of the stepped portion; and a lower portion to which the anchor attachment portion is bonded and which is curved to protrude downward, a height in a vehicle upward/downward direction of the hollow cross section of the upper portion may be set to be higher than a hollow cross section of the lower portion, and the beads may be formed on the lower portion.

According to the above-mentioned configuration, the bead on the lower portion can extend to the upper portion with a high hollow cross section. Accordingly, rigidity of the upper portion and the lower portion (i.e., stiffener) can be increased, and the tensile load input to the anchor member can be supported by the stiffener. Accordingly, support rigidity of the anchor member against the tensile load input to the anchor member can be further increased.

According to the aspect of the present invention, deformation of the floor panel due to the tensile load input from the anchor member can be suppressed.

DESCRIPTION OF EMBODIMENTS

Figure 1:
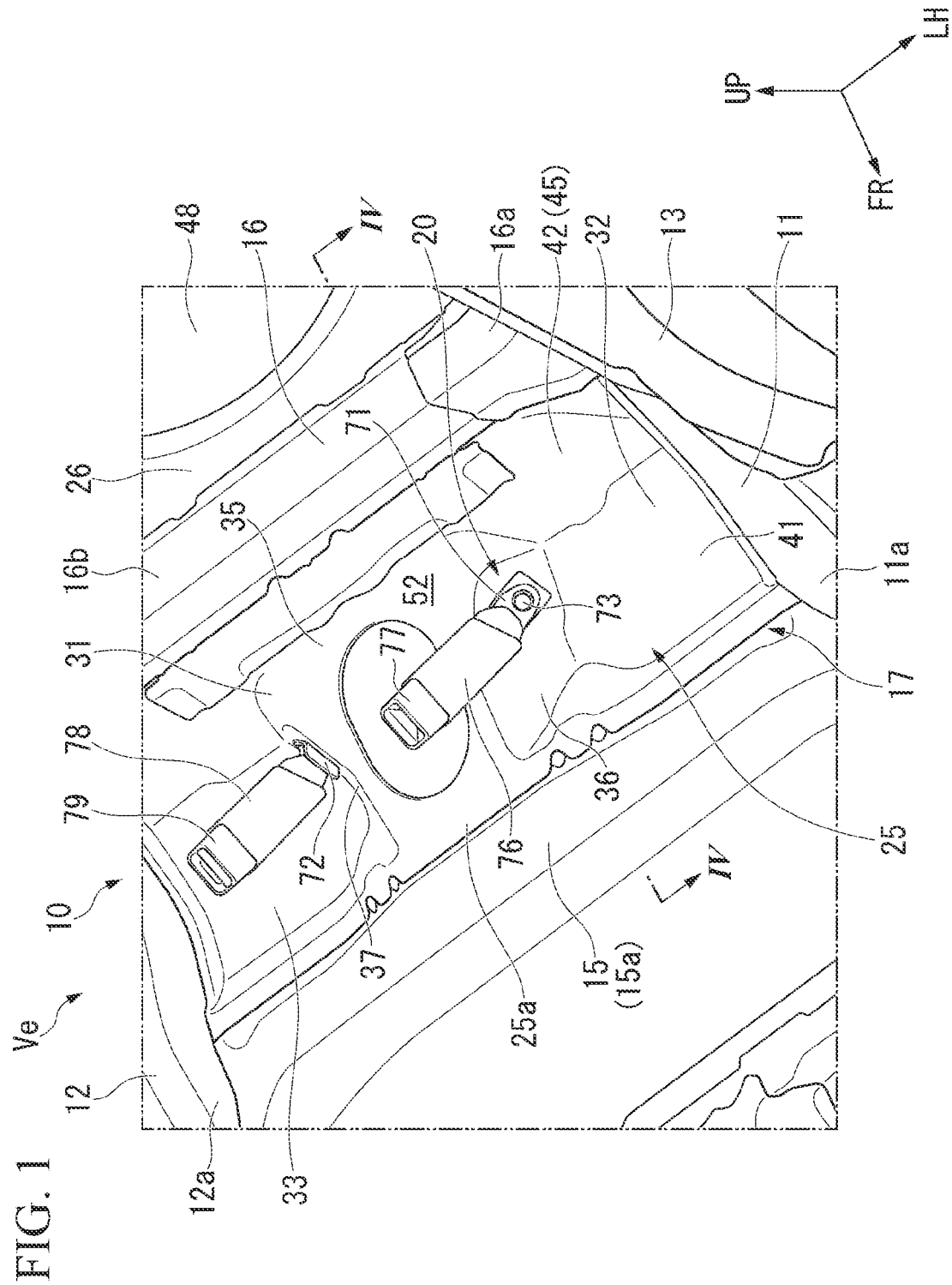
FIG. 1 is a perspective view showing a vehicle structure with an anchor unit according to an embodiment of the present invention.

Hereinafter, a vehicle structure with an anchor unit according to an embodiment of the present invention will be described with reference to the accompanying drawings. Further, in the drawings, an arrow FR indicates a forward direction of a vehicle, an arrow UP indicates an upward direction of the vehicle, and an arrow LH indicates a leftward direction of the vehicle.

<Vehicle Structure with an Anchor Unit>

Figure 2:
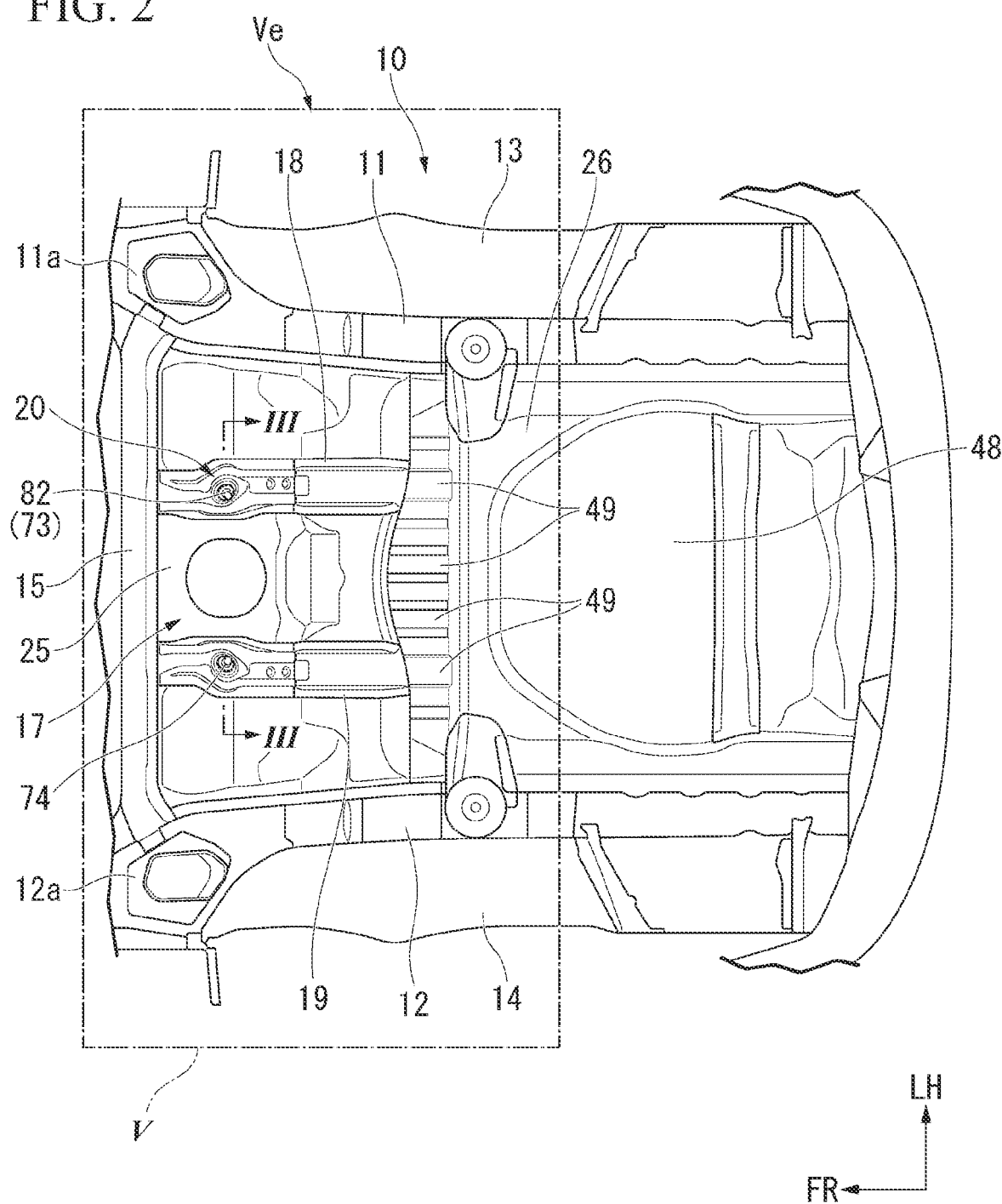
FIG. 2 is a bottom view showing the vehicle structure with an anchor unit according to the embodiment.

FIG. 1 is a perspective view showing a vehicle structure 10 with an anchor unit according to an embodiment. FIG. 2 is a bottom view showing the vehicle structure 10 with an anchor unit according to the embodiment.

As shown in FIG. 1 and FIG. 2, a vehicle Ve includes, for example, the vehicle structure 10 with an anchor unit provided on a rear portion of the vehicle Ve.

Hereinafter, the vehicle structure 10 with an anchor unit is abbreviated as "the vehicle structure 10."

The vehicle structure 10 includes left and right rear side frames 11 and 12, left and right damper housings (damper housings) 13 and 14, a front cross member (floor cross member) 15, a rear cross member 16, a floor panel 17, left and right stiffeners (stiffeners) 18 and 19, and an anchor unit (seat belt fixing structure) 20.

<Rear Side Frame>

The left rear side frame 11 and the right rear side frame 12 are provided outside a vehicle rear portion in a vehicle width direction (i.e., on left and right outer sides). The left rear side frame 11 and the right rear side frame 12 are, for example, frame members with high rigidity that constitute a part of a vehicle body frame by being formed in a closed hollow cross section.

The left rear side frame 11 extends from a rear end portion of a left side sill (not shown) toward the rear of the vehicle. The right rear side frame 12 extends from a rear end portion of a right side sill (not shown) toward the rear of the vehicle.

The left damper housing 13 is provided on the left rear side frame 11. The left damper housing 13 overhangs outward from the left rear side frame 11 in a vehicle width direction (leftward), and is formed to cover a left damper or a left rear wheel (not shown) from above.

The right damper housing 14 is provided on the right rear side frame 12. The right damper housing 14 overhangs outward from the right rear side frame 12 in the vehicle width direction (rightward), and is formed to cover a right damper and a right rear wheel (not shown) from above.

<Front Cross Member, Rear Cross Member>

The front cross member 15 bridges between a front end portion 11a of the left rear side frame 11 and a front end portion 12a of the right rear side frame 12. The front cross member 15 is a frame member with high rigidity, which extends in the vehicle width direction and configures a part of the vehicle body frame.

The rear cross member 16 is provided on a rear side of the front cross member of the vehicle at an interval. The rear cross member 16 is disposed behind the front cross member 15 of the vehicle and above the front cross member 15. The rear cross member 16 is a frame member with high rigidity, which extends in the vehicle width direction and constitutes a part of the vehicle body frame.

The rear cross member 16 has a left end portion 16a that is connected to a wall portion of the left damper housing 13 via a left bracket (not shown). The rear cross member 16 has a right end portion 16b that is connected to a wall portion of the right damper housing 14 via a right bracket (not shown). That is, the rear cross member 16 connects the left damper housing 13 and the right damper housing 14.

<Floor Panel>

Figure 3:
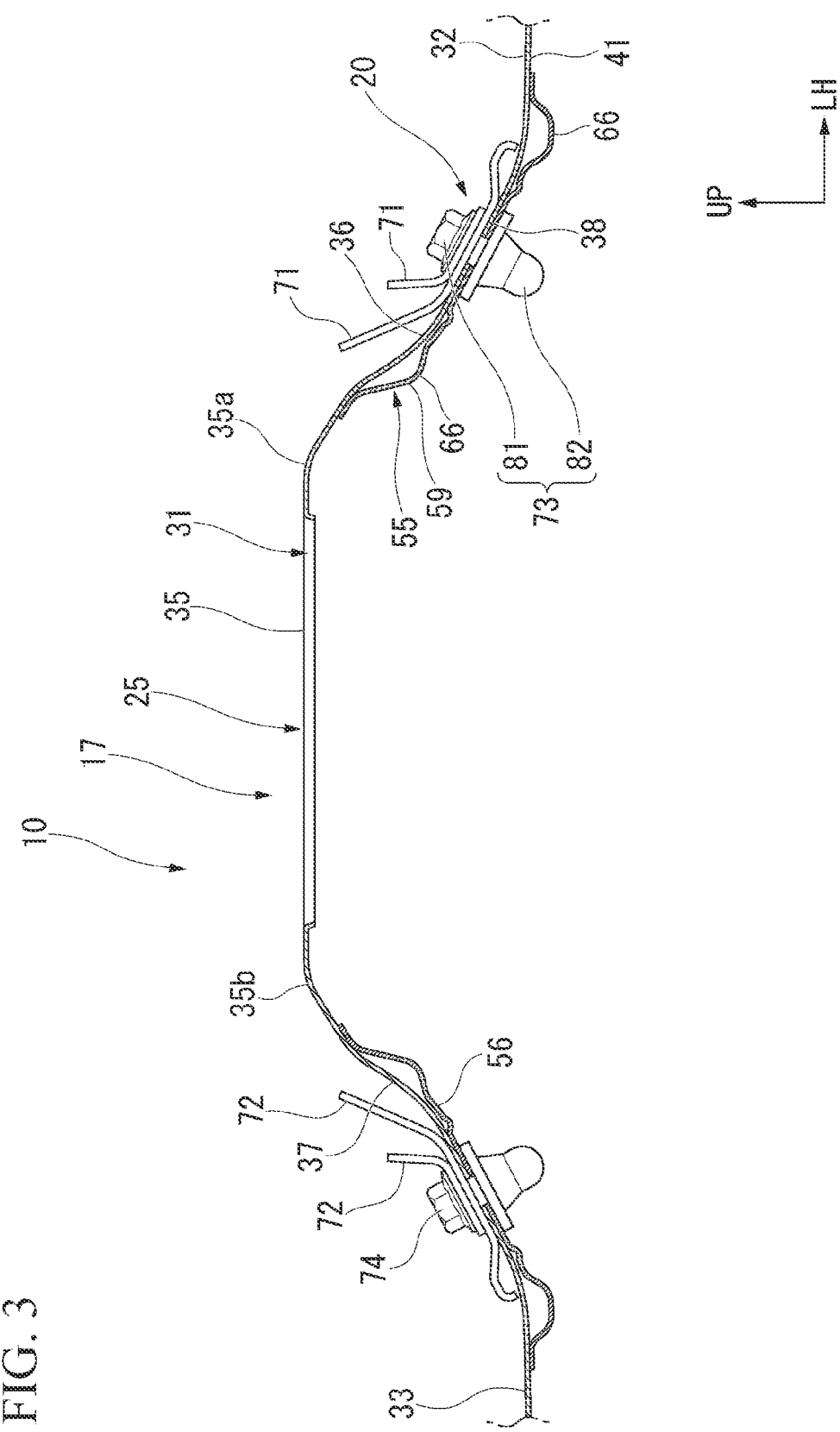
FIG. 3 is a cross-sectional view along line in FIG. 2.
Figure 4:
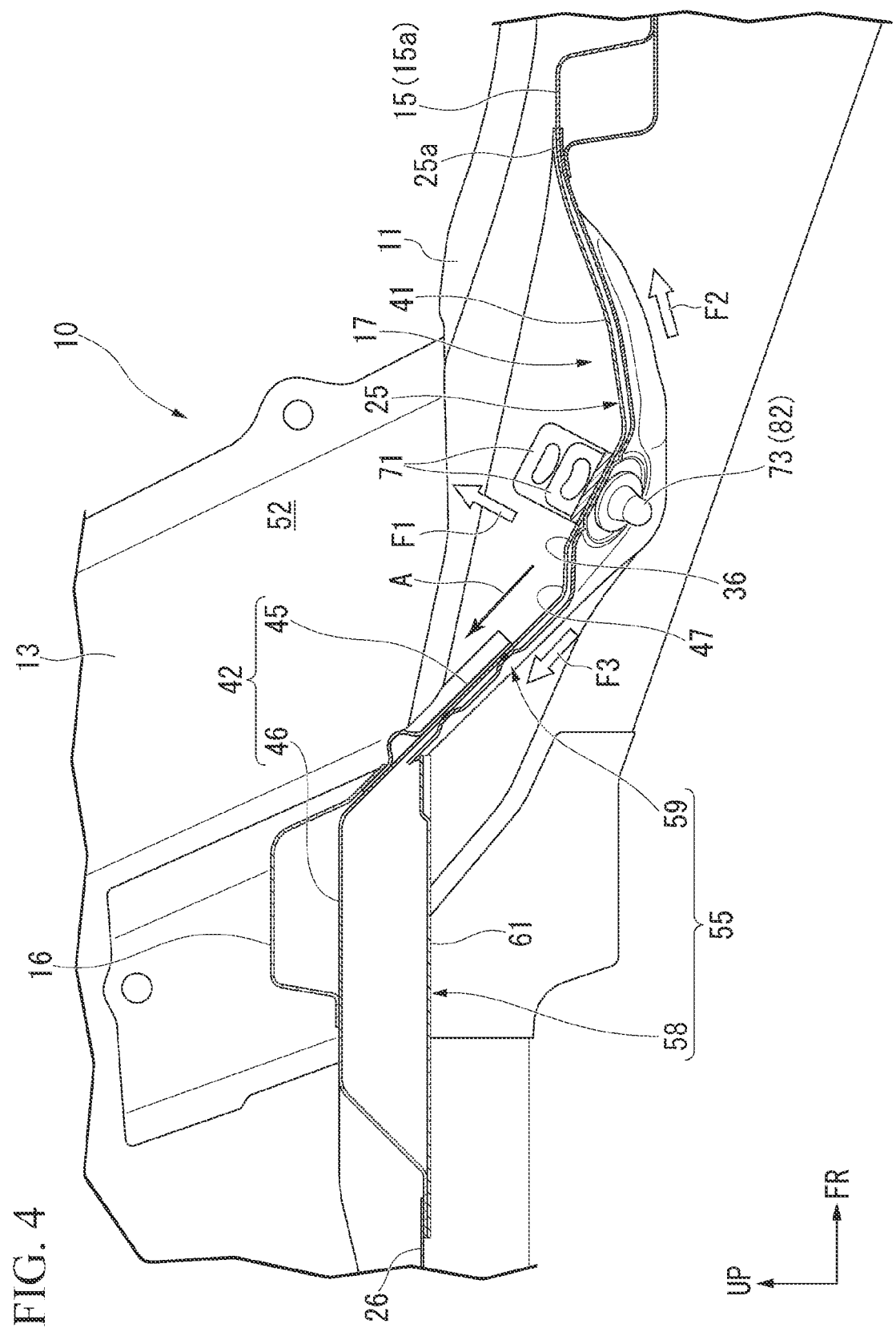
FIG. 4 is a cross-sectional view along line IV-IV in FIG. 1.

FIG. 3 is a cross-sectional view along line in FIG. 2. FIG. 4 is a cross-sectional view along line IV-IV in FIG. 1.

As shown in FIG. 1, FIG. 3 and FIG. 4, the floor panel 17 extends from the front cross member 15 toward the rear of the vehicle. The floor panel 17 includes a first floor panel 25 and a second floor panel 26. The first floor panel 25 and the second floor panel 26 are continuously integrated.

The first floor panel 25 is disposed below a rear seat (not shown). The first floor panel 25 is provided in a region formed by the left rear side frame 11, the right rear side frame 12, the front cross member 15, and the rear cross member 16. The first floor panel 25 has a front end portion 25a bonded to an apex portion 15a of the front cross member 15, and a rear end portion (specifically, a panel apex portion 46, which will be described below) bonded to a bottom portion of the rear cross member 16.

In the first floor panel 25, the rear end portion (the panel apex portion 46) is disposed above the front end portion 25a of the vehicle (hereinafter, may be abbreviated as "above"). Further, the first floor panel 25 has a left side portion bonded to the left rear side frame 11, and a right side portion bonded to the right rear side frame 12. The second floor panel 26 extends from the rear end portion (the panel apex portion 46) of the first floor panel 25 toward the rear of the vehicle. The second floor panel 26 will be described below.

The first floor panel 25 includes a raised portion 31, a left panel portion 32, and a right panel portion 33. The raised portion 31 is raised upward from the left panel portion 32 and the right panel portion 33 at a center in the vehicle width direction. The front cross member 15 is in front of the raised portion 31 of the vehicle, and the rear cross member 16 is provided behind the raised portion 31 of the vehicle.

The raised portion 31 includes a raised apex portion 35, a left raised sidewall (sidewall) 36, and a right raised sidewall (sidewall) 37. In the raised apex portion 35, a front end portion is bonded to the center of the apex portion 15a of the front cross member 15 in the vehicle width direction from above, and is inclined upward with a gentle upward slope to near a bottom portion of the rear cross member 16.

The left raised sidewall 36 is folded in a downward diagonal inclination shape from a left end portion 35a of the raised apex portion 35 toward a left side in the vehicle width direction. The left raised sidewall 36 forms a left wall portion (wall portion) extending in a vehicle upward/downward direction (hereinafter, may be abbreviated as "an upward/downward direction") in the first floor panel 25. In other words, the left wall portion is formed at the left raised sidewall 36 disposed on the left side of the raised portion 31 in the vehicle width direction.

The right raised sidewall 37 is folded in a downward diagonal inclination shape from a right end portion 35b of the raised apex portion 35 toward the right side in the vehicle width direction. The right raised sidewall 37 forms a right wall portion (wall portion) of the first floor panel 25 in the upward/downward direction. In other words, the right wall portion is formed at the right raised sidewall 37 disposed on the right side of the raised portion 31 in the vehicle width direction.

The left panel portion 32 includes a panel bottom portion (bottom portion) 41, and a panel stepped portion (stepped portion) 42. In the panel bottom portion 41, a front end portion is bonded to the left side of the apex portion 15a of the front cross member 15 in the vehicle width direction from above. The panel bottom portion 41 is inclined downward with a gentle downward slope to a center between the front cross member 15 and the rear cross member 16 from the front end portion toward the rear of the vehicle. The panel bottom portion 41 is disposed below an anchor attachment portion 73, which will be described below.

The panel stepped portion 42 includes a panel inclined portion 45 and a panel apex portion (apex portion) 46. The panel inclined portion 45 is inclined upward with an upward slope to near the rear cross member 16 as it goes from the rear end portion of the panel bottom portion 41 toward the rear of the vehicle.

The panel apex portion 46 is formed integrally with an upper end portion of the panel inclined portion 45. The panel apex portion 46 protrudes upward and is formed in, for example, a trapezoidal shape. A bottom portion of the rear cross member 16 is bonded to the panel apex portion 46 from above. Accordingly, the panel bottom portion 41 is disposed at a position lower than the rear cross member 16.

In addition, stiffener upper portions 58 of a left stiffener 55 and a right stiffener 56, which will be described below, are bonded to a back surface of the panel apex portion 46 from an outer side (a lower side) of a passenger compartment 52.

Since the right panel portion 33 is formed in a substantially symmetrical shape with respect to the left panel portion 32, detailed description will be omitted.

As shown in FIG. 1, FIG. 2 and FIG. 4, the second floor panel 26 extends from the rear end portion of the panel apex portion 46 toward the rear of the vehicle. The second floor panel 26 includes a tire pan 48 and a plurality of bead portions 49. The tire pan 48 is formed to be recessed downward to accommodate a spare tire (not shown). The plurality of bead portions 49 are provided in front of the tire pan 48 of the vehicle. For example, the plurality of bead portions 49 are formed to be uneven in the upward/downward direction continuously in the vehicle width direction. The plurality of bead portions 49 extend in the vehicle forward/rearward direction. Accordingly, the plurality of bead portions 49 are areas with high rigidity against a load input in the vehicle forward/rearward direction.

<Left Stiffener, Right Stiffener>

Figure 5:
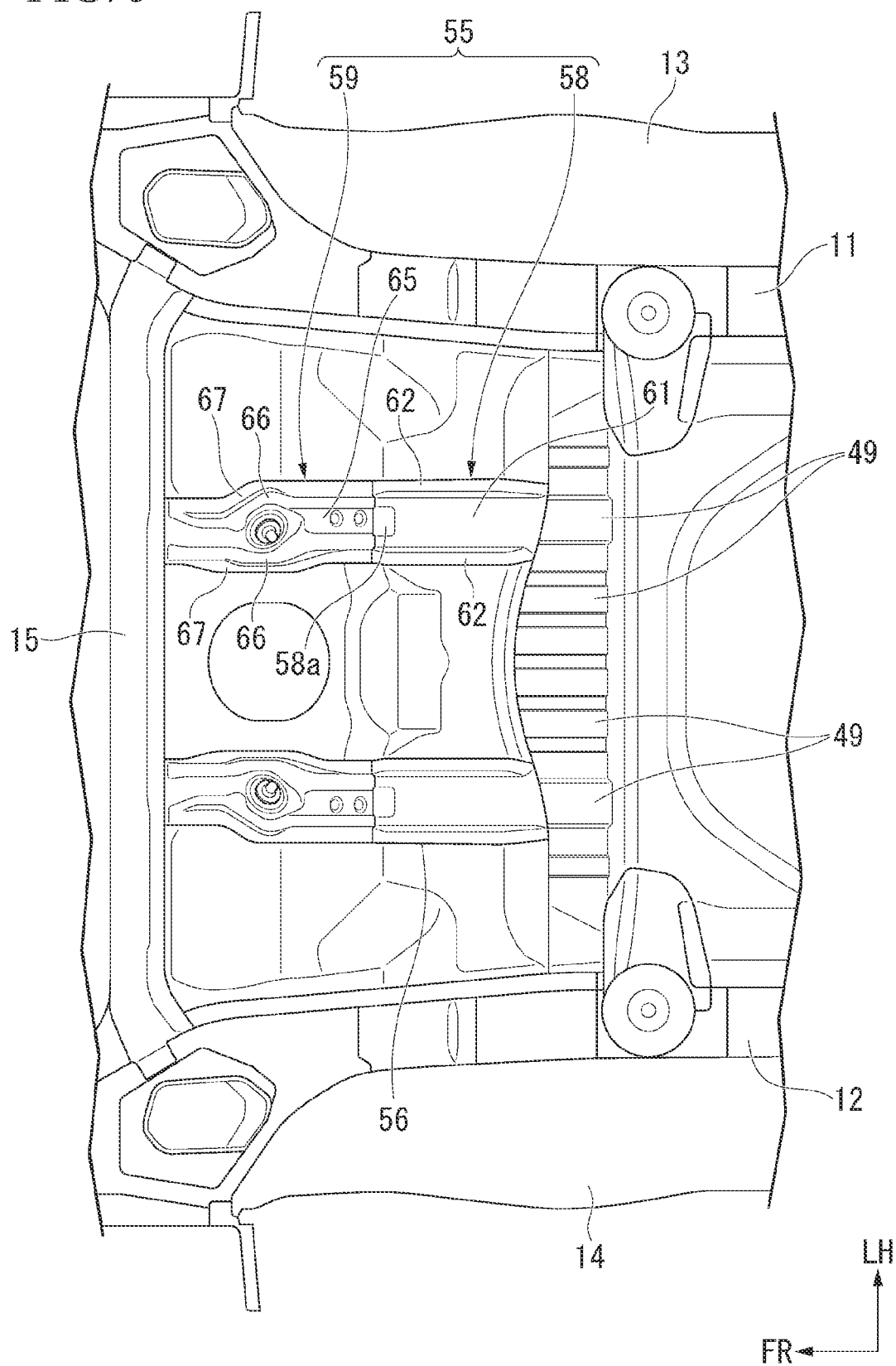
FIG. 5 is an enlarged bottom view of a portion V in FIG. 2.
Figure 6:
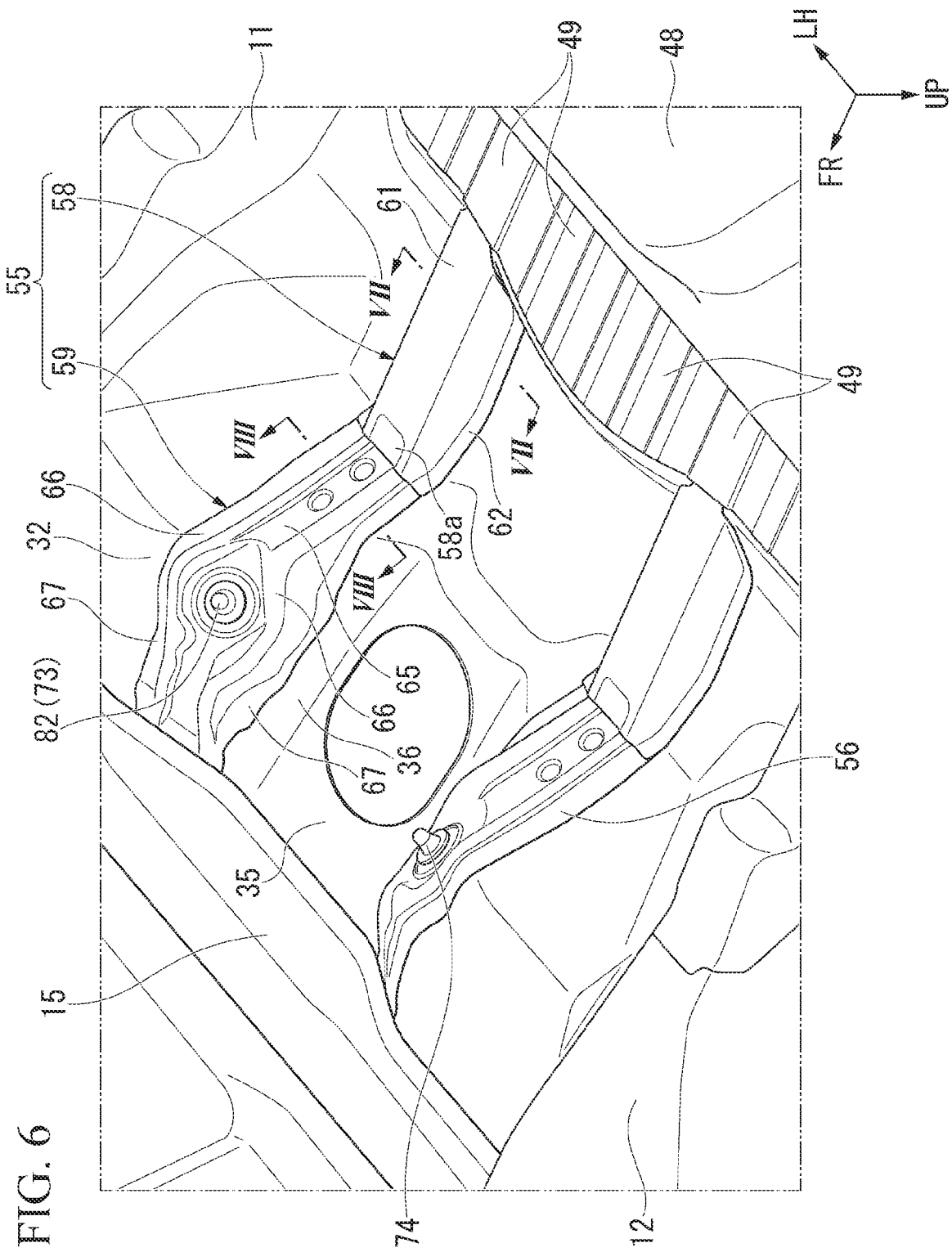
FIG. 6 is a perspective view when the vehicle structure with an anchor unit according to the embodiment is seen from below.

FIG. 5 is an enlarged bottom view of a portion V in FIG. 2. FIG. 6 is a perspective view of the vehicle structure 10 with an anchor unit according to the embodiment when seen from below.

As shown in FIG. 4 to FIG. 6, the left stiffener 55 and the right stiffener 56 are provided on the floor panel 17. The left stiffener 55 and the right stiffener 56 are provided outside the passenger compartment 52 (see FIG. 1) in the floor panel 17 (i.e., a lower side of the floor panel 17). The left stiffener 55 and the right stiffener 56 are disposed on left and right sides from a center in the vehicle width direction at an interval, and extend in the vehicle forward/rearward direction.

The left stiffener 55 and the right stiffener 56 extend from the front cross member 15 toward the rear of the vehicle. The left stiffener 55 and the right stiffener 56 are bonded while crossing the rear cross member 16 (see FIG. 1). In addition, left stiffener 55 and the right stiffener 56 extend to the plurality of bead portions 49 toward the rear of the vehicle. The left stiffener 55 includes a stiffener upper portion (upper portion) 58 and a stiffener lower portion (lower portion) 59.

Figure 7:
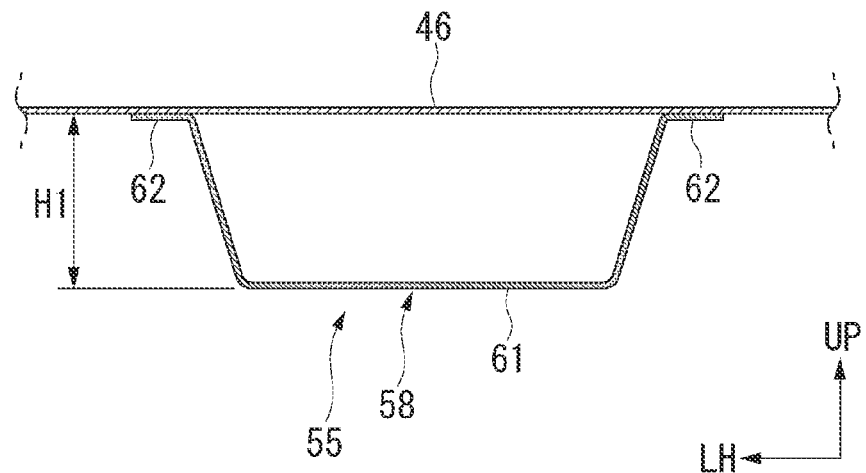
FIG. 7 is a cross-sectional view along line VII-VII in FIG. 6.

FIG. 7 is a cross-sectional view along line VII-VII in FIG. 6.

As shown in FIG. 4 and FIG. 7, the stiffener upper portion 58 includes an upper main body portion 61 and a pair of upper flanges 62. The upper main body portion 61 protrudes in a U-shaped cross section by being curved to protrude downward. The pair of upper flanges 62 overhang from both end portions of the upper main body portion 61 toward an outer side of the upper main body portion 61. That is, the stiffener upper portion 58 is formed in a hat-shaped cross section by the upper main body portion 61 and the pair of upper flanges 62.

The pair of upper flanges 62 are bonded to a back surface of the panel apex portion 46 from below. In this state, the stiffener upper portion 58 is disposed in the vehicle forward/rearward direction and bonded to the rear cross member 16 (see FIG. 1) while crossing it.

An upper hollow cross section (hollow cross section) is formed between the stiffener upper portion 58 and the panel apex portion 46. In the stiffener upper portion 58, a height of the upper hollow cross section in the upward/downward direction is set to H1. The stiffener lower portion 59 is disposed in front of the stiffener upper portion 58 of the vehicle.

Figure 8:
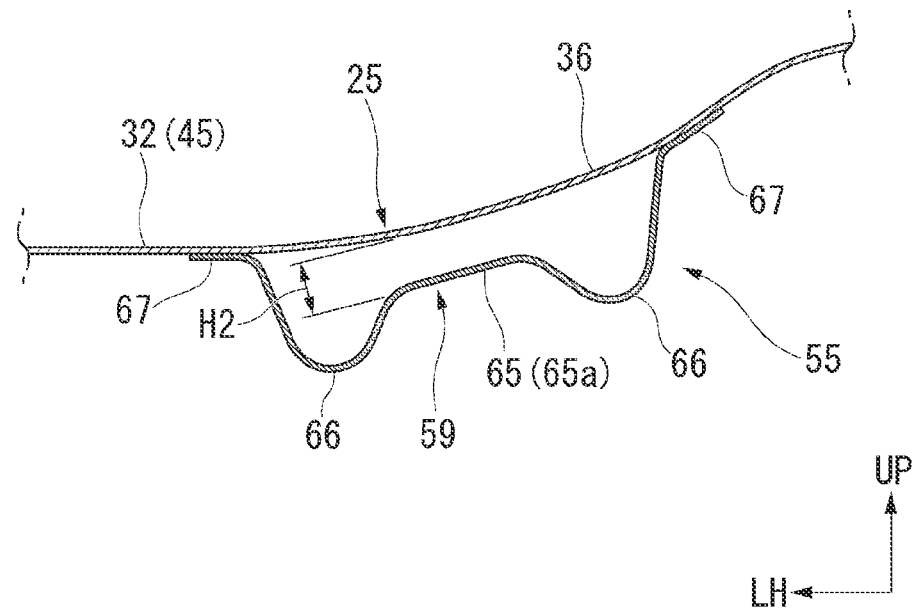
FIG. 8 is a cross-sectional view along line VIII-VIII in FIG. 6.

FIG. 8 is a cross-sectional view along line VIII-VIII in FIG. 6.

As shown in FIG. 6 and FIG. 8, the stiffener lower portion 59 extends from the front cross member 15 to a tip portion 58a of the stiffener upper portion 58 toward the rear of the vehicle. The stiffener lower portion 59 includes a lower main body portion 65, a plurality of (in the embodiment, a pair of) beads 66, and a pair of lower flanges 67. In the embodiment, while the pair of beads 66 are exemplarily described as the plurality of beads 66, the number of the beads 66 may be selected arbitrarily.

The lower main body portion 65 is curved to protrude downward. The pair of beads 66 are formed on both side portions (left and right side portions) in a bottom portion (lower portion) 65a of the lower main body portion 65 at an interval in the vehicle width direction. The pair of beads 66 are formed at both sides (left and right sides) of the anchor attachment portion 73, which will be described below, in the vehicle width direction, and extend in the longitudinal direction of the stiffener lower portion 59. The pair of beads 66 protrude from both sides of the bottom portion 65a to protrude downward.

The pair of lower flanges 67 overhang from both end portions of the lower main body portion 65 toward the outer side of the lower main body portion 65. The pair of lower flanges 67 are bonded to a back surface of the first floor panel 25 (specifically, the left raised sidewall 36 and the left panel portion 32) from below. In this case, the stiffener lower portion 59 is disposed in the vehicle forward/rearward direction. A lower hollow cross section is formed by the stiffener lower portion 59 and the first floor panel 25. In the stiffener lower portion 59, a height of the lower hollow cross section in the upward/downward direction is set to H2.

As shown in FIG. 6 to FIG. 8, a height H1 of an upper hollow cross section of the stiffener upper portion 58 is set to be higher than a height H2 of a lower hollow cross section of the stiffener lower portion 59. In addition, for example, in the stiffener lower portion 59, a height of the pair of beads 66 in the upward/downward direction is set to substantially the same height as the height H1 of the stiffener upper portion 58 in the upper hollow cross section. Accordingly, the stiffener upper portion 58 and the stiffener lower portion 59 (i.e., the left stiffener 55) have increased rigidity.

Since the right panel portion 33 is formed in a substantially symmetrical shape with respect to the left panel portion 32, detailed description will be omitted.

Figure 9:
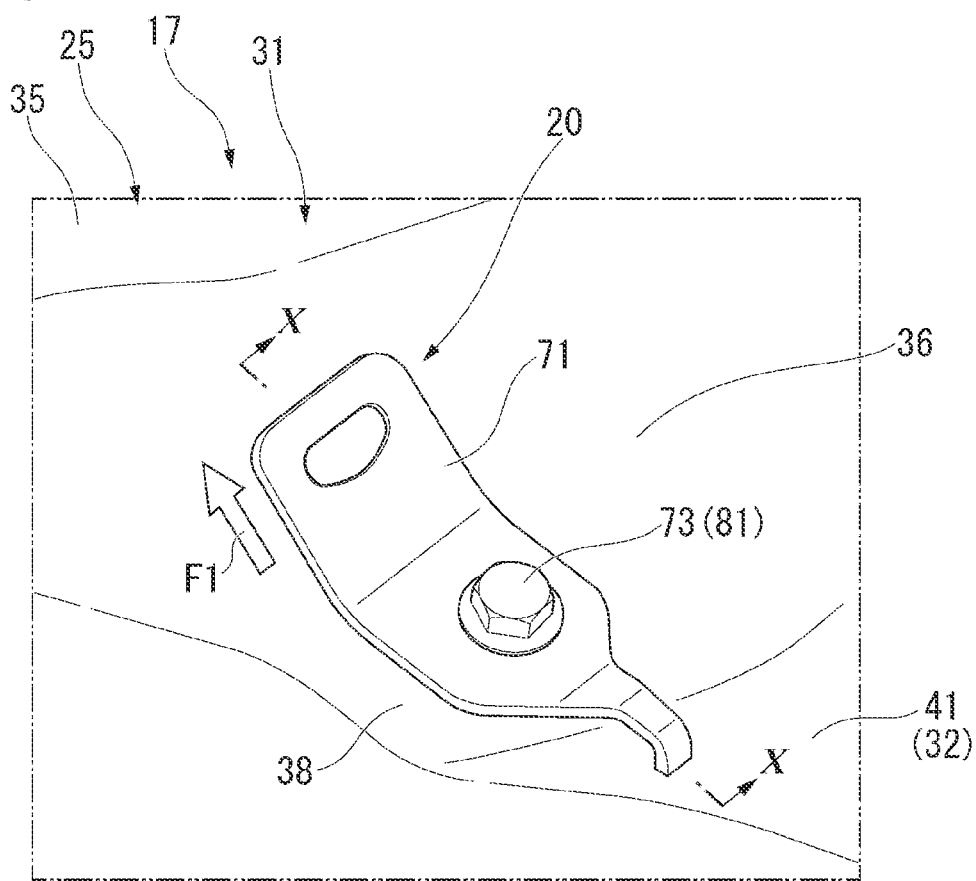
FIG. 9 is a perspective view showing a state in which a left anchor member according to the embodiment is attached to a left raised sidewall.

FIG. 9 is a perspective view showing a state in which a left anchor member 71 according to the embodiment is attached to the left raised sidewall 36.

As shown in FIG. 1, FIG. 4 and FIG. 9, in the raised portion 31 of the first floor panel 25, the anchor unit 20 is provided on the left raised sidewall 36 and the right raised sidewall 37. The anchor unit 20 includes the left anchor member (anchor member) 71, a right anchor member (anchor member) 72, a left anchor attachment portion (anchor attachment portion) 73, and a right anchor attachment portion (anchor attachment portion) 74 (see FIG. 3).

The left anchor member 71 is connected to a left buckle 77 via a left inner webbing 76 of a seat belt on a left side. The right anchor member 72 is connected to a right buckle 79 via a right inner webbing 78 of a seat belt on a right side.

The right anchor member 72 and the right anchor attachment portion 74 are formed in a substantially symmetrical shape with respect to the left anchor member 71 and the left anchor attachment portion 73. Accordingly, hereinafter, the left anchor member 71 and the left anchor attachment portion 73 are abbreviated as "the anchor member 71" and "the anchor attachment portion 73," and detailed description of the right anchor member 72 and the right anchor attachment portion 74 will be omitted.

Figure 10:
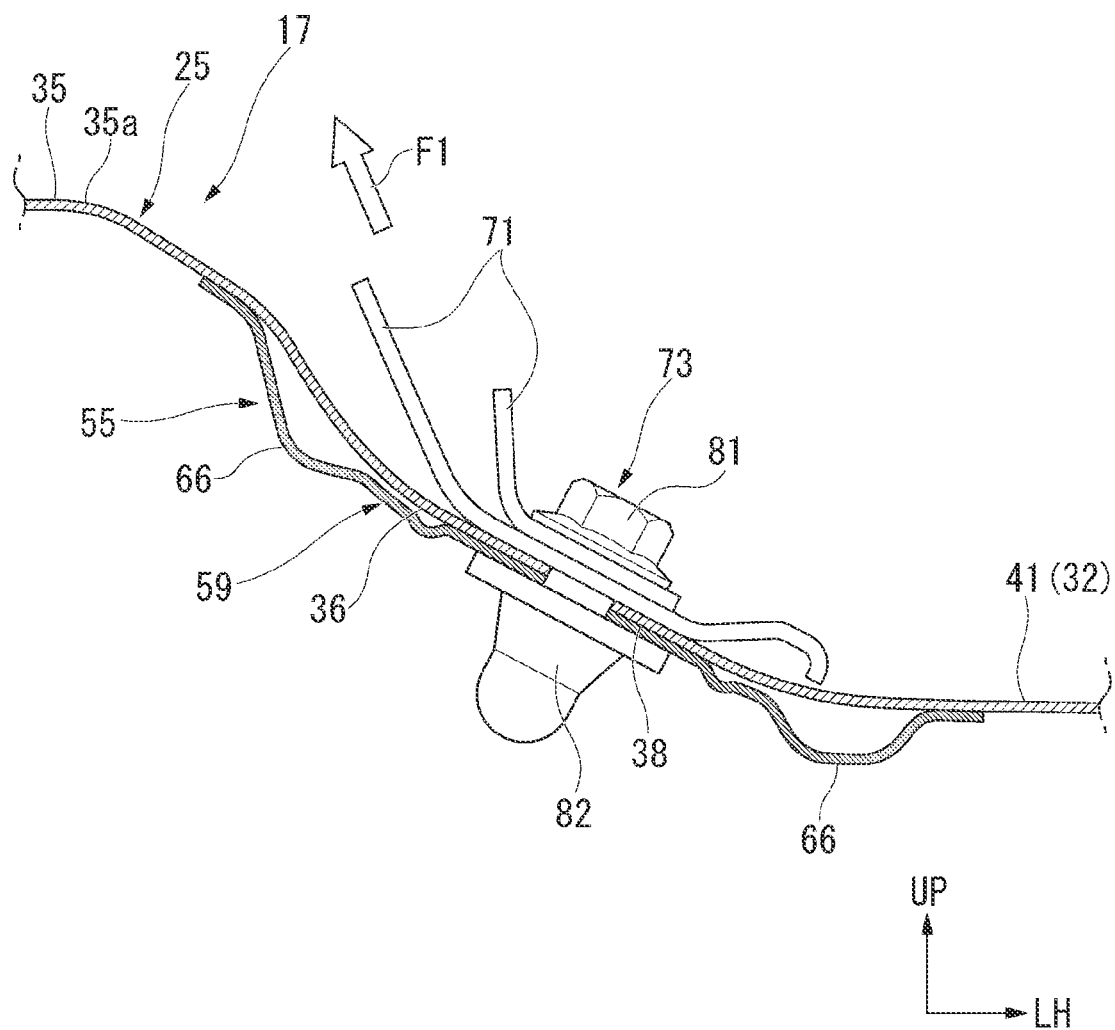
FIG. 10 is a cross-sectional view along line X-X in FIG. 9.

FIG. 10 is a cross-sectional view along line X-X in FIG. 9.

As shown in FIG. 4 and FIG. 10, the anchor member 71 is attached (connected) to the left raised sidewall 36 by the anchor attachment portion 73 (in the embodiment, a bolt 81 and a nut 82).

That is, the anchor attachment portion 73 is disposed on the left raised sidewall 36. While the bolt 81 and the nut 82 will be exemplarily described as the anchor attachment portion 73 in the embodiment, they are not limited to the bolt 81 and the nut 82 and, for example, another anchor attachment portion such as rivet or the like may be used.

As shown in FIG. 3 and FIG. 10, the anchor attachment portion 73 is attached to an outer side (left side) the left raised sidewall 36 in the vehicle width direction from below. That is, the anchor attachment portion 73 is disposed above the panel bottom portion 41 and in the vicinity of the panel bottom portion 41 (adjacent to the panel bottom portion 41). In other words, the anchor attachment portion 73 is attached to a rising-up section 38 of the left raised sidewall 36. The rising-up section 38 is an area with high rigidity adjacent to a corner rising up from the panel bottom portion 41 to the left raised sidewall 36.

As shown in FIG. 6 and FIG. 10, the anchor member 71 is attached (bonded) to the stiffener lower portion 59 by the anchor attachment portion 73 via the left raised sidewall 36. That is, the anchor attachment portion 73 is attached (bonded) to the left raised sidewall 36 and the stiffener lower portion 59.

The pair of beads 66 are formed on both sides of the anchor attachment portion 73 in the vehicle width direction. The pair of beads 66 extend in the longitudinal direction of the stiffener lower portion 59. The stiffener lower portion 59 and the stiffener upper portion 58 (i.e., the left stiffener 55) extend from the front cross member to the plurality of bead portions 49 toward the rear of the vehicle.

As shown in FIG. 4 and FIG. 10, the anchor attachment portion 73 is disposed above the panel bottom portion 41 and in the vicinity of the panel bottom portion 41, and thus, attached to the rising-up section 38 of the left raised sidewall 36. Here, the panel bottom portion 41 is disposed at a position lower than the rear cross member 16. Accordingly, the anchor attachment portion 73 is disposed at a position lower than the rear cross member 16.

Specifically, the anchor attachment portion 73 is disposed in the vicinity of a panel crossing portion 47 (adjacent to the panel crossing portion 47) where the panel bottom portion 41 and the panel inclined portion 45 cross each other, and at a position lower than the rear cross member 16.

As described above, according to the vehicle structure 10 with an anchor unit of the embodiment, the following effects can be exhibited. Further, in the following description, a configuration of the vehicle structure 10 with an anchor unit on the left side will be described, and description of a configuration on the right side will be omitted.

As shown in FIG. 9 and FIG. 10, the anchor member 71 is attached to the left raised sidewall 36 of the floor panel 17 by the anchor attachment portion 73 (i.e., the bolt 81 and the nut 82). Accordingly, when a tensile load F1 is applied to the anchor member 71 toward an upper front side via the seat belt (not shown), the tensile load F1 directed toward the upper front side is input to the left raised sidewall 36 via the anchor member 71 and the anchor attachment portion 73. The left raised sidewall 36 to which the tensile load F1 is input extends in the upward/downward direction in which the tensile load F1 is applied. Accordingly, the left raised sidewall 36 can receive (support) the tensile load F1 directed to the upper front side in a direction along the left raised sidewall 36 (hereinafter, also referred to as a shearing direction).

In this way, for example, in comparison with the case in which the tensile load F1 is applied to the left raised sidewall 36 in the vertical direction by applying the tensile load F1 along the left raised sidewall 36 in the shearing direction, rigidity of the left raised sidewall 36 can be increased. Accordingly, the tensile load F1 input to the left raised sidewall 36 via the anchor member 71 and the anchor attachment portion 73 can be efficiently transmitted and distributed over the entire floor panel 17. Accordingly, it is possible to secure support rigidity of the seat belt, and prevent deformation of the floor panel 17 due to the tensile load F1 input from the anchor member 71.

In this way, the anchor member 71 is attached to the left raised sidewall 36 of the floor panel 17. Accordingly, it is possible to suppress deformation of the floor panel 17 due to the tensile load F1 input from the anchor member 71 without increasing the weight of the vehicle Ve (see FIG. 1), and reduction in weight of the vehicle Ve is achieved.

In addition, the left raised sidewall 36 of the raised portion 31 is used as the wall portion to which the anchor member 71 is attached. Accordingly, for example, there is no need to form a new wall portion, to which the anchor member 71 is attached, on the floor panel 17. Accordingly, simplification of the configuration is achieved.

Further, the raised portion 31 is an area with relatively high rigidity by being raised upward. Accordingly, it is possible to increase support rigidity of the left raised sidewall 36 against the tensile load F1 input from the seat belt (i.e., the anchor member 71) by the wall portion to which the anchor member 71 is attached using the left raised sidewall 36 of the raised portion 31.

In addition, as shown in FIG. 3 and FIG. 9, the anchor attachment portion 73 is attached to the rising-up section 38 of the left raised sidewall 36 by being attached to an outer side (left side) of the left raised sidewall 36 in the vehicle width direction from below. The rising-up section 38 is an area with high rigidity in the vicinity of a corner rising up from the panel bottom portion 41 to the left raised sidewall 36.

Accordingly, the tensile load F1 input from the anchor attachment portion 73 can be supported by the entire raised portion 31 by attaching the anchor attachment portion 73 to the rising-up section 38. Accordingly, it is possible to further increase support rigidity of the anchor member 71 against the tensile load F1.

In addition, as shown in FIG. 6 and FIG. 10, the anchor member 71 is attached to the stiffener lower portion 59 by the anchor attachment portion 73 via the left raised sidewall 36. Accordingly, the tensile load F1 input from the anchor member 71 can be supported by the stiffener lower portion 59 (i.e., the left stiffener 55). Accordingly, it is possible to further increase support rigidity of the anchor member 71 against the tensile load F1.

In addition, the pair of beads 66 are formed on the stiffener lower portion 59 on both sides of the anchor attachment portion 73 in the vehicle width direction. Accordingly, rigidity of the stiffener lower portion 59 (i.e., the left stiffener 55) can be increased by the pair of beads 66. Accordingly, the tensile load F1 input from the anchor member 71 can be more appropriately supported by the left stiffener 55. Accordingly, support rigidity of the anchor member 71 against the tensile load F1 can be further increased.

Further, the plurality of bead portions 49 are provided in front of the tire pan 48 of the vehicle, and the left stiffener (i.e., the stiffener lower portion 59 and the stiffener upper portion 58) extends from the front cross member 15 to the bead portions 49. Accordingly, the tensile load F1 input from the anchor member 71 can be transmitted to the tire pan 48 via the left stiffener 55 and the bead portions 49. The tire pan 48 is an area with high rigidity by being formed in a concave shape.

Accordingly, the tensile load F1 can be appropriately supported by the tire pan 48 by transmitting the tensile load F1 to the tire pan 48. Accordingly, support rigidity of the anchor member 71 against the tensile load F1 can be further increased, and displacement of the anchor member 71 due to the tensile load F1 can be suppressed by a simple configuration including the plurality of bead portions 49 in front of the tire pan 48 of the vehicle.

In addition, as shown in FIG. 4 and FIG. 6, the left stiffener 55 extends from the front cross member 15 toward the rear of the vehicle. Further, the stiffener upper portion 58 of the left stiffener 55 is bonded to the rear cross member 16 while crossing it. Accordingly, rigidity of the left stiffener 55 can be increased by the front cross member and the rear cross member 16.

Accordingly, the tensile load F1 input from the anchor member 71 can be efficiently transmitted to the front cross member 15 via the left stiffener 55 as a load F2 and to the rear cross member 16 as a load F3. Accordingly, the tensile load F1 can be appropriately supported by the front cross member 15 and the rear cross member 16.

Here, the rigidity of the rear cross member 16 is ensured by being connected to the left damper housing 13 and the right damper housing 14 (both, see FIG. 2). The left stiffener 55 crosses the rear cross member 16. Accordingly, the tensile load F1 transmitted from the left stiffener 55 to the rear cross member 16 can be efficiently distributed on the rear cross member 16 to support the rear cross member 16 more appropriately.

Accordingly, support rigidity of the anchor member 71 against the tensile load F1 can be further increased, and displacement of the anchor member 71 by the tensile load F1 can be suppressed by a simple configuration in which the left stiffener 55 extends from the front cross member 15 to the rear cross member 16.

In addition, the anchor attachment portion 73 is disposed in the vicinity of the panel crossing portion 47 in the panel inclined portion 45 and disposed at a position lower than the rear cross member 16. The panel crossing portion 47 is an area in which the panel bottom portion 41 and the panel inclined portion 45 cross each other. Accordingly, the tensile load F1 input to the anchor attachment portion 73 can be diverted from the panel bottom portion 41 toward the panel stepped portion 42 (specifically, the panel inclined portion 45) like an arrow A (for example, the load F3) at an acute angle. Accordingly, rigidity on the side of the panel inclined portion 45 against the tensile load F1 input to the anchor attachment portion 73 can be increased.

Further, the rear cross member 16 is disposed on the panel apex portion 46 of the panel stepped portion 42. Accordingly, the tensile load F1 input to the anchor member 71 can be efficiently supported by the rear cross member 16, and support rigidity of the anchor member 71 against the tensile load F1 can be further increased.

In addition, as shown in FIG. 6 to FIG. 8, the height H1 of the upper hollow cross section of the stiffener upper portion 58 is set to be higher than the height H2 of the lower hollow cross section of the stiffener lower portion 59, and the pair of beads 66 are formed on the stiffener lower portion 59. Since the pair of beads are formed on the stiffener lower portion 59, the pair of beads 66 of the stiffener lower portion 59 can extend to the stiffener upper portion 58.

Accordingly, rigidity of the stiffener upper portion 58 and the stiffener lower portion 59 (i.e., the left stiffener 55) can be increased, and the tensile load F1 (see FIG. 10) input to the anchor member 71 can be supported by the left stiffener 55. Accordingly, support rigidity of the anchor member 71 (see FIG. 10) against the tensile load F1 input to the anchor member 71 can be further increased.

Further, the technical scope of the present invention is not limited to the embodiment, and various modifications may be made without departing from the scope of the present invention.

In addition, it is possible to replace the components in the embodiment with known components as appropriate without departing from the scope of the present invention, and the above-mentioned variants may be combined as appropriate.

What is claimed is:

1. A vehicle structure with an anchor unit comprising:
   a floor panel disposed below a rear seat; and
   an anchor member of a seat belt connected to the floor panel by an anchor attachment portion,
   wherein the floor panel has a wall portion extending in an upward/downward direction, and
   the wall portion faces a side direction in a vehicle width direction, and
   the anchor attachment portion is provided on the wall portion.

2. A vehicle structure with an anchor unit, comprising:
   a floor panel disposed below a rear seat; and
   an anchor member of a seat belt connected to the floor panel by an anchor attachment portion,
   wherein the floor panel has a wall portion extending in an upward/downward direction,
   the anchor attachment portion is provided on the wall portion,
   the floor panel has a raised portion rising upward at a center in a vehicle width direction, and
   the wall portion is a sidewall of the raised portion disposed at a side surface in the vehicle width direction.

3. The vehicle structure with an anchor unit according to claim 2,
   wherein the anchor attachment portion is attached to a lower section at an outer side in the vehicle width direction of the sidewall of the raised portion.

4. The vehicle structure with an anchor unit according to claim 3, comprising:
   a stiffener extending in a vehicle forward/rearward direction to an outer side of a passenger compartment in the floor panel,
   wherein the anchor member is bonded to the stiffener by the anchor attachment portion.

5. The vehicle structure with an anchor unit according to claim 4,
   wherein the stiffener has a plurality of beads extending in a longitudinal direction of the stiffener on both sides in the vehicle width direction of the anchor attachment portion.

6. The vehicle structure with an anchor unit according to claim 5, comprising:
   a front cross member provided at a vehicle forward position of the raised portion; and
   a rear cross member provided at a vehicle rearward position of the raised portion and connected to a damper housing, wherein the stiffener extends from the front cross member toward a vehicle rearward side and crosses the rear cross member.

7. The vehicle structure with an anchor unit according to claim 6,
wherein the rear cross member is disposed on a stepped portion inclined upward toward a vehicle rearward direction from a bottom portion of the floor panel disposed below the anchor attachment portion, and
the anchor attachment portion is disposed at a position lower than the rear cross member.

8. The vehicle structure with an anchor unit according to claim 7,
wherein the stiffener includes:
an upper portion that forms a hollow cross section with an apex portion of the stepped portion; and
a lower portion to which the anchor attachment portion is bonded and which is curved to protrude downward,
wherein a height in a vehicle upward/downward direction of the hollow cross section of the upper portion is set to be higher than a hollow cross section of the lower portion, and the beads are formed on the lower portion.

9. The vehicle structure with an anchor unit according to claim 4, comprising:
a tire pan provided on a vehicle rearward side of the floor panel and recessed downward; and
a bead portion extending in the vehicle forward/rearward direction at a vehicle forward position of the tire pan,
wherein the stiffener extends to the bead portion toward a vehicle rearward direction.

10. The vehicle structure with an anchor unit according to claim 5, comprising:
a tire pan provided on a vehicle rearward side of the floor panel and recessed downward; and
a bead portion extending in the vehicle forward/rearward direction at a vehicle forward position of the tire pan,
wherein the stiffener extends to the bead portion toward a vehicle rearward direction.

* * * * *